Sept. 15, 1931.    W. E. GILLENWATER    1,823,138
CHILD'S VEHICLE
Filed Jan. 30, 1930
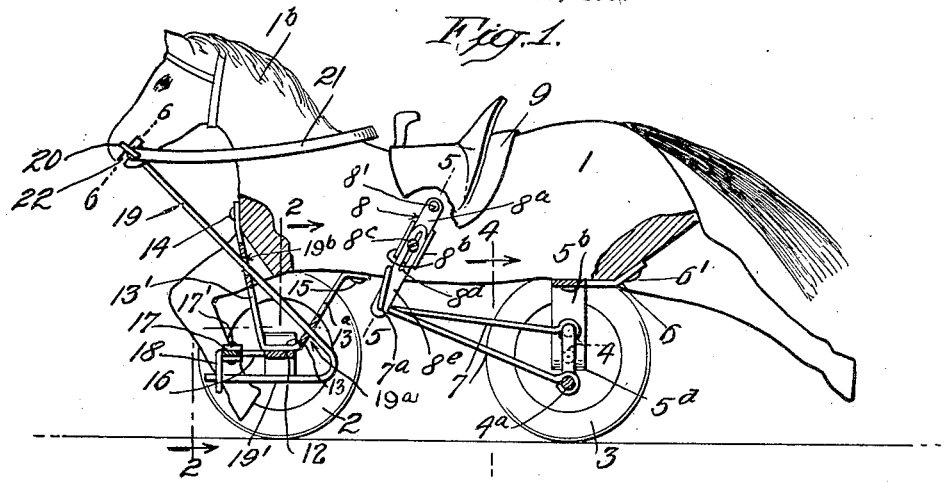
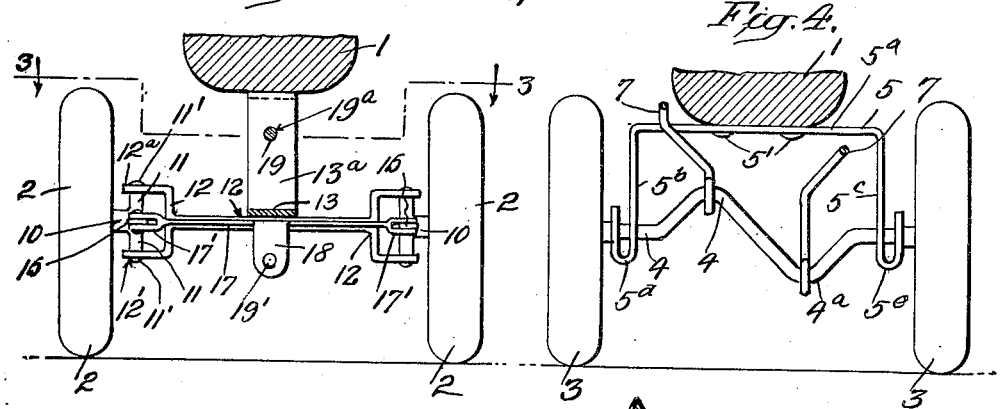
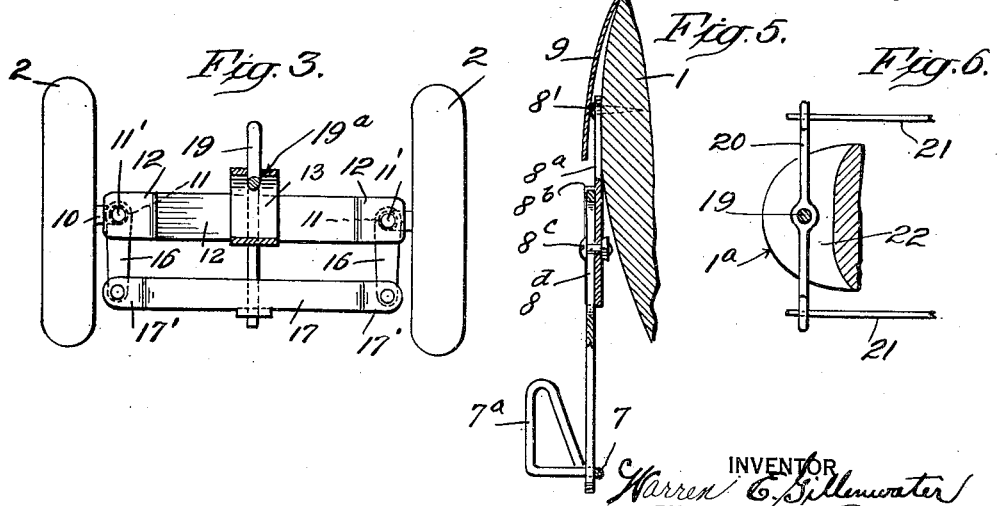
INVENTOR
Warren E. Gillenwater
BY
Randolph & Green
ATTORNEYS Patented Sept. 15, 1931

1,823,138

UNITED STATES PATENT OFFICE

WARREN E. GILLENWATER, OF BELLINGHAM, WASHINGTON

CHILD'S VEHICLE

Application filed January 30, 1930. Serial No. 424,525.

This invention relates to improvements in child's vehicle.

One of the objects of this invention is to provide a child's vehicle with means for steering by a distant-control element.

Still another object of my invention is to produce a vehicle of the type which has a body in the form of a horse or other animal and providing a pivotally-mounted front-wheel steering element having an operative connection with a bit mounted in a slot representing the animal's mouth and adapted to be actuated by a rein to steer the vehicle.

Still another object of my invention is to provide in a child's vehicle of the type hereinabove specified a steering element mounted in an inclined position extending forwardly and upwardly to connect at its upper end with a bit in the animal's mouth and provided at its lower end with a laterally movable element for engaging and swinging the wheel gear for the front wheels.

Still another object of my invention is to provide, in combination with a suitable propelling mechanism, a simplified steering means operable by distant-control from the seat of the vehicle and preferably comprising an upwardly and forwardly inclined steering rod mounted pivotally on the vehicle and extending at its upper end through the lower jaw of an animal and operable at said upper end by manual movement of a rein connected with a bit mounted in a slot representing the mouth of the animal, said rod having at its lower end a horizontally-movable member provided with an operative connection with a pair of front wheels, each mounted on a stub shaft having a connection with pivot members mounted in transverse supports and being connected together to move in unison.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a side elevation of a child's pedal-propelled vehicle in which the body is in the form of a horse;

Fig. 2 is a section on the line 2—2 of Fig. 1, looking in the direction of the arrow;

Fig. 3 is a section on the line 3—3 of Fig. 2, looking in the direction of the arrow;

Fig. 4 is a section on the line 4—4 of Fig. 1, looking in the direction of the arrow;

Fig. 5 is a fragmentary section on the line 5—5 of Fig. 1; and

Fig. 6 is a fragmentary section on the line 6—6 of Fig. 1.

Referring now to these drawings, which illustrates a preferred embodiment of my invention, the child's vehicle has a body 1 in the form of a wooden horse and is mounted upon four wheels comprising pairs of front and rear wheels 2 and 3 respectively. Obviously said body might, if desired, be mounted on two wheels like a bicycle or on three wheels like a tricycle without departing from the spirit of my invention.

In said preferred form of my invention, the rear end of the body 1 is supported upon a pair of wheels 3 which are fast upon a shaft 4 bearing adjacent to opposite ends in a transversely-disposed supporting member 5 fastened, as shown, to the body 1 of the wooden horse by screws 5' and having a rearward longitudinally-disposed extension 6 also fastened beneath the body 1 by screws 6'. As illustrated, the supporting member 5 is bent to provide integrally an attaching portion $5^a$ and vertical legs $5^b$ and $5^c$, which terminate in U-shaped bearing members $5^d$, $5^e$ to provide a firm bearing for the shaft or axle 4. As illustrated, said shaft or axle is provided intermediate the bearings 5ᵈ, 5ᵉ with oppositely-bent crank portions 4, 4ᵃ and these crank portions are connected by propelling rods 7 having pedals 7ᵃ at their opposite ends and having a pivotal connection at said opposite ends with stirrup straps 8 which, as shown, are themselves pivotally mounted on pins 8′ extending into the body of the wooden horse beneath a saddle 9 mounted in the conventional manner on the back of the wooden horse. Each of the stirrup straps 8 is preferably adjustable to fit the legs of smaller or larger children and, as illustrated, is composed of a pivoted strap 8ᵃ preferably provided with sliding guideways 8ᵇ and a centrally-disposed bolt 8ᶜ which cooperates with a slot 8ᵈ in a movable plate 8ᵉ to permit elongation or shortening as desired.

The front wheels 2, in the preferred embodiment shown in the drawings, are fixed on stub shafts 10 fastened to or preferably formed integrally with vertical pivot members 11 which, as shown, are pivoted at their opposite ends 12′, 12ᵃ in the bearing forks at opposite ends of a stationary double forked bearing member or transverse axle 12 and headed at 11′. Said bearing member 12 is rigidly connected intermediate its ends preferably by welding or the like with a centrally-located longitudinally-extending supporting member 13 fastened, as shown, at its opposite ends to the body of the horse by screws 14 and 15.

Projecting forwardly from the pivots 11 at right angles to the stub shafts are a pair of links 16 which are pivotally connected together by a connecting rod 17 having, as shown, its forked ends 17′ pivotally connected with the links 16. In said preferred embodiment, the connecting member 17 is provided with a centrally-disposed depending lug 18 which, as shown, is engaged with a lower horizontally-disposed laterally-swinging bent end 19′ of the steering shaft 19. Said shaft 19 is preferably pivotally mounted in a forwardly-inclined position and, as illustrated, is so mounted to extend at one end through the lower jaw 1ᵃ of the wooden horse or body and is pivotally mounted intermediate its ends at 19ᵃ and 19ᵇ in the legs 13′ and 13ᵃ of the supporting member 13. In said preferred embodiment of my invention, a bit 20 is fastened, within a slot 22 representing the mouth of the horse, to the pivoted steering shaft 19 in such manner that movement of the opposite ends of the bit 20 will rotate said pivotally-mounted steering shaft 19 and will thus swing a horizontally-disposed laterally-swinging steering rod 19′ which preferably forms an integral part thereof in opposite directions. Through its engagement with the lug 18 the steering rod 19′ will, acting through the connecting rod 17, links 16 and pivots 11 cause a steering movement of the front wheels in the direction desired.

In the preferred embodiment of my invention, I provide distant control for the pivotal movement of the steering shaft 19 through the bit 20 and preferably connect to the opposite ends of the bit 20 a rein 21, the looped portion of which is passed over the neck 1ᵇ of the wooden horse and in proximity to the saddle 9 so as to be within reach of the hands of a child sitting in the said saddle.

The operation of the device will be apparent from the above description, it being only necessary to say that the vehicle may be propelled through the pedals 7ᵃ by the feet of a child and may be readily and easily steered by pulling on the rein 21 at one or the other sides of the neck of the animal in the same manner as a horse is guided.

Having described my invention, I claim:—

1. A child's vehicle embodying, in combination, a vehicle body in the form of an animal mounted upon wheels and having a mouth and a seat, a rear wheel-mounting shaft, wheel-mounting means at the front and rear of said vehicle, steering mechanism arranged at the front of said vehicle and connected with said front-wheel mounting means, said steering mechanism embodying a rotatable steering shaft connected with the wheel-steering mechanism and extending into the mouth of the animal forming said vehicle body, and means operable to rotate said shaft in the animal's mouth to steer the vehicle.

2. A child's vehicle embodying, in combination, a vehicle body in the form of an animal mounted upon wheels and having a mouth and a seat, wheel-mounting means at the front and rear of said vehicle, steering mechanism arranged at the front of said vehicle and connected with said front-wheel mounting means, said steering element comprising a pivoted shaft having at its lower end an operative connection with the front-wheel mounting means and at its upper end extending in an inclined direction forwardly and into the mouth of the said animal forming the vehicle body, a rocking element movable in the mouth of the animal for rocking said pivoted member to steer the vehicle, and means connected to said operating element for rocking said element from the seat of the vehicle.

3. A child's vehicle embodying, in combination, a vehicle body in the form of an animal mounted upon wheels and having a mouth and a seat, wheel-mounting means at the front and rear of said vehicle, steering mechanism arranged at the front of said vehicle and connected with said front-wheel mounting means, said steering element comprising a pivoted shaft having at its lower end an operative connection with the front-wheel mounting means and at its upper end extending in an inclined direction forwardly through the lower jaw and into the mouth of the said animal forming the vehicle body, a rocking element comprising a bit mounted within a slot representing the mouth of the animal and connected intermediate its ends with said steering shaft, and a rein connected at opposite ends with the opposite ends of the bit.

In witness whereof, I have signed my name to the foregoing specification.

WARREN E. GILLENWATER.